(12) United States Patent
Wiegman

(10) Patent No.: US 11,777,334 B2
(45) Date of Patent: Oct. 3, 2023

(54) SYSTEM FOR CHARGING MULTIPLE POWER SOURCES AND MONITORING DIODE CURRENTS FOR FAULTS

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/524,090

(22) Filed: Nov. 11, 2021

(65) Prior Publication Data
US 2023/0145553 A1 May 11, 2023

(51) Int. Cl.
| | | |
|---|---|---|
| H02J 7/00 | (2006.01) | |
| B60L 3/04 | (2006.01) | |
| H02J 1/00 | (2006.01) | |
| H01M 10/44 | (2006.01) | |
| B60L 3/00 | (2019.01) | |
| H02J 1/10 | (2006.01) | |

(52) U.S. Cl.
CPC ........ *H02J 7/00712* (2020.01); *B60L 3/0046* (2013.01); *B60L 3/04* (2013.01); *H01M 10/441* (2013.01); *H02J 1/108* (2013.01); *H02J 7/0029* (2013.01); *B60L 2200/10* (2013.01)

(58) Field of Classification Search
CPC ...... H02J 7/00712; H02J 1/108; H02J 7/0029; B60L 3/0046; B60L 3/04; H01M 10/441
USPC .......................................................... 320/165
See application file for complete search history.

(56) References Cited

U.S. PATENT DOCUMENTS

| | | | | |
|---|---|---|---|---|
| 4,142,151 A | * | 2/1979 | Hansen | .................. G01R 31/40 340/645 |
| 4,281,278 A | * | 7/1981 | Bilsky | ....................... H02J 7/35 320/136 |

(Continued)

OTHER PUBLICATIONS

"Electrical Substation Bus Schemes Explained," Testguy, Testguy. net, Published Online Aug. 15, 2016, Accessed Online Feb. 2, 2022, https://testguy.net/content/256-electrical-substation-bus-schemes-explained ;rest of hyperlink in office action) (Year: 2016).*

(Continued)

*Primary Examiner* — John T Trischler
(74) *Attorney, Agent, or Firm* — CALDWELL INTELLECTUAL PROPERTY LAW

(57) ABSTRACT

A system for charging multiple power sources including a plurality of batteries. The system also including a plurality of diodes, each diode of the plurality of diodes electrically connected in series with at least a battery of the plurality of batteries, wherein each diode of the plurality of diodes restricts current flow into the plurality of batteries and the plurality of diodes permits current flow from the plurality of batteries. The system includes a bus element connecting the batteries in parallel, having a cross tie element having an engaged state and disengaged state. The bus element disconnects a first battery from a second battery of the plurality of when the cross-tie element is in the disengaged state, and connects the first battery to the second battery when the cross tie element is in the engaged state. The system includes a load electrically connected to the plurality of diodes.

17 Claims, 7 Drawing Sheets

(56) References Cited

U.S. PATENT DOCUMENTS

| | | | | |
|---|---|---|---|---|
| 4,319,178 A * | 3/1982 | Sugalski | H01M 50/213 | 429/100 |
| 4,422,180 A * | 12/1983 | Wendt | G05D 1/0077 | 398/112 |
| 4,770,954 A * | 9/1988 | Noordenbos | H01M 16/00 | 429/50 |
| 5,280,237 A * | 1/1994 | Buks | G01R 31/316 | 324/762.08 |
| 5,483,144 A * | 1/1996 | Marek | B60L 53/11 | 320/DIG. 30 |
| 5,488,283 A * | 1/1996 | Dougherty | H01M 10/44 | 320/145 |
| 5,506,456 A * | 4/1996 | Yang | H02M 3/158 | 307/77 |
| 5,521,811 A * | 5/1996 | Levran | H02M 7/219 | 363/141 |
| 5,631,534 A * | 5/1997 | Lewis | H01M 10/441 | 320/118 |
| 5,760,570 A * | 6/1998 | Nagai | H01M 10/46 | 320/DIG. 31 |
| 5,784,626 A * | 7/1998 | Odaohara | H02J 9/061 | 713/340 |
| 5,929,602 A * | 7/1999 | Suzuki | H02J 7/342 | 320/160 |
| 6,307,350 B1 * | 10/2001 | Alderman | H01M 10/425 | 320/116 |
| 6,343,023 B1 * | 1/2002 | Wunderlich | H02M 3/33576 | 363/16 |
| 6,583,523 B1 * | 6/2003 | Bhate | H02J 1/10 | 320/140 |
| 7,009,364 B2 * | 3/2006 | Stanesti | H02J 7/0069 | 320/135 |
| 7,064,521 B2 * | 6/2006 | Stanesti | H02J 7/0069 | 320/149 |
| 7,246,773 B2 * | 7/2007 | Stoner | B64D 15/14 | 244/134 D |
| 7,296,909 B2 * | 11/2007 | Van Deursen | F21V 21/06 | 362/208 |
| 7,342,360 B2 * | 3/2008 | Van Deursen | H01M 50/572 | 315/86 |
| 7,364,320 B2 * | 4/2008 | Van Deursen | F21V 21/406 | 362/398 |
| 7,414,381 B2 * | 8/2008 | Popescu-Stanesti | H02J 7/0069 | 320/149 |
| 7,489,110 B2 * | 2/2009 | Stanesti | H02J 7/0018 | 320/135 |
| 7,763,993 B2 * | 7/2010 | Groff | H02J 9/061 | 307/66 |
| 7,791,313 B2 * | 9/2010 | Stanesti | H02J 7/0068 | 320/116 |
| 7,852,047 B2 * | 12/2010 | Osamura | H02J 7/0026 | 320/DIG. 15 |
| 8,569,998 B2 * | 10/2013 | Shim | H02J 7/00036 | 307/65 |
| 8,699,199 B2 * | 4/2014 | Blakes | H02H 7/001 | 361/141 |
| 8,797,042 B2 * | 8/2014 | Ike | G01R 31/52 | 324/426 |
| 8,941,264 B2 * | 1/2015 | Scruggs | B60R 16/033 | 307/52 |
| 8,981,710 B2 * | 3/2015 | Hintz | H02M 3/1582 | 320/134 |
| 8,987,935 B2 * | 3/2015 | King | B60L 58/26 | 307/10.1 |
| 9,018,866 B2 * | 4/2015 | Ashida | B60L 3/04 | 318/34 |
| 9,024,585 B2 * | 5/2015 | Nakashima | H02J 7/0026 | 320/117 |
| 9,045,052 B2 * | 6/2015 | Girard | H01M 10/441 | |
| 9,048,513 B2 * | 6/2015 | Butzmann | B60L 58/18 | |
| 9,236,790 B2 * | 1/2016 | Inakagata | H02J 1/102 | |
| 9,270,102 B2 * | 2/2016 | Kikuchi | B60L 53/14 | |
| 9,270,135 B2 * | 2/2016 | Kumagai | H02J 7/007 | |
| 9,276,419 B2 * | 3/2016 | Borinato | H02J 7/045 | |
| 9,325,179 B1 * | 4/2016 | Voytenko | A61N 1/3931 | |
| 9,444,118 B2 * | 9/2016 | Kim | H01M 10/0445 | |
| 9,490,506 B2 * | 11/2016 | Suzuki | H02J 7/0063 | |
| 9,509,152 B2 * | 11/2016 | Peh | H01M 10/615 | |
| 9,653,928 B2 * | 5/2017 | Shim | H01M 10/482 | |
| 9,755,440 B2 * | 9/2017 | Ishibashi | H02J 7/0018 | |
| 9,802,562 B2 * | 10/2017 | Yasunori | B60R 16/02 | |
| 9,897,658 B2 * | 2/2018 | Zhang | G01R 31/3835 | |
| 9,997,763 B2 * | 6/2018 | Biskup | H02J 7/0031 | |
| 10,008,862 B2 * | 6/2018 | Takizawa | H01M 10/482 | |
| 10,038,335 B2 * | 7/2018 | Shibata | H01L 31/02021 | |
| 10,051,718 B2 * | 8/2018 | Kim | H02J 7/0031 | |
| 10,096,866 B2 * | 10/2018 | Nagato | G01R 31/3647 | |
| 10,103,534 B2 * | 10/2018 | She | H02M 7/003 | |
| 10,103,567 B2 * | 10/2018 | Moore | H02J 7/345 | |
| 10,135,293 B2 * | 11/2018 | Mosman | H02J 9/061 | |
| 10,141,786 B2 * | 11/2018 | Kamikihara | B60L 53/12 | |
| 10,256,511 B2 * | 4/2019 | Clemente | H01M 10/4264 | |
| 10,347,952 B2 * | 7/2019 | Choi | G01R 31/3648 | |
| 10,363,825 B2 * | 7/2019 | Rao | H02J 7/0036 | |
| 10,381,825 B2 * | 8/2019 | Tung | H02J 7/0016 | |
| 10,443,881 B2 * | 10/2019 | Cubizolles | F04D 27/004 | |
| 10,461,545 B2 * | 10/2019 | Inoue | B60L 58/12 | |
| 10,491,013 B2 * | 11/2019 | Kang | H02J 7/0026 | |
| 10,516,194 B2 * | 12/2019 | Zhou | H01M 8/04067 | |
| 10,522,882 B2 * | 12/2019 | Nagato | H01M 10/482 | |
| 10,554,056 B2 * | 2/2020 | Jeon | H02J 7/0026 | |
| 10,609,836 B2 * | 3/2020 | Belady | H02J 9/061 | |
| 10,631,388 B2 * | 4/2020 | Tsai | H05B 45/48 | |
| 10,790,679 B2 * | 9/2020 | Motoichi | H02J 7/00304 | |
| 10,953,754 B1 * | 3/2021 | Wiegman | B60L 3/12 | |
| 11,019,747 B2 * | 5/2021 | Belady | G06F 1/26 | |
| 11,043,703 B1 * | 6/2021 | Zeng | H01M 50/209 | |
| 11,095,131 B2 * | 8/2021 | Zhou | H02J 7/0047 | |
| 11,165,261 B2 * | 11/2021 | Motoichi | H02J 7/0013 | |
| 11,165,419 B2 * | 11/2021 | Nakano | H02H 3/05 | |
| 11,186,202 B2 * | 11/2021 | Sugimura | B60L 58/12 | |
| 11,201,378 B2 * | 12/2021 | Huynh | H01M 50/502 | |
| 11,447,015 B1 * | 9/2022 | Wiegman | B60L 50/60 | |
| 2002/0140397 A1 * | 10/2002 | Hasegawa | H02J 7/1423 | 320/104 |
| 2004/0113585 A1 * | 6/2004 | Stanesti | H02J 7/02 | 320/116 |
| 2004/0155627 A1 * | 8/2004 | Stanesti | H02J 7/0068 | 320/127 |
| 2005/0168194 A1 * | 8/2005 | Stanesti | H02J 7/0018 | 320/134 |
| 2006/0082321 A1 * | 4/2006 | Van Deursen | F16M 13/005 | 362/208 |
| 2006/0152197 A1 * | 7/2006 | Stanesti | H02J 7/0018 | 320/135 |
| 2006/0175977 A1 * | 8/2006 | Deursen | F16M 11/242 | 315/185 S |
| 2006/0181865 A1 * | 8/2006 | Van Deursen | F21V 21/06 | 362/55 |
| 2006/0244420 A1 * | 11/2006 | Stanesti | H02J 7/0019 | 320/128 |
| 2007/0188140 A1 * | 8/2007 | Chen | H02J 7/34 | 320/128 |
| 2007/0216378 A1 * | 9/2007 | Ozawa | H02J 7/0068 | 323/252 |
| 2008/0012529 A1 * | 1/2008 | Chang | H02J 7/0016 | 320/116 |
| 2008/0252265 A1 * | 10/2008 | Kokubun | H02M 3/156 | 320/162 |
| 2009/0189572 A1 * | 7/2009 | Kamatani | H02J 7/0036 | 320/163 |
| 2009/0206795 A1 * | 8/2009 | Stanesti | H02J 7/0068 | 320/135 |
| 2010/0013312 A1 * | 1/2010 | Groff | H02J 9/061 | 307/66 |
| 2010/0080027 A1 * | 4/2010 | Wiegman | H02J 1/102 | 363/126 |
| 2010/0120581 A1 * | 5/2010 | Mitsutani | B60L 53/60 | 477/7 |

(56) References Cited

U.S. PATENT DOCUMENTS

| | | | |
|---|---|---|---|
| 2010/0194352 A1* | 8/2010 | Kitano | H02J 7/00308 320/162 |
| 2011/0007445 A1* | 1/2011 | Blakes | H01F 6/003 165/10 |
| 2011/0175564 A1* | 7/2011 | Shim | H01M 10/482 320/101 |
| 2012/0032645 A1* | 2/2012 | Matsuura | H02J 7/0031 320/134 |
| 2012/0146588 A1* | 6/2012 | Ishibashi | H02J 7/0018 320/138 |
| 2012/0181873 A1* | 7/2012 | Butzmann | B60L 58/18 307/82 |
| 2012/0182024 A1* | 7/2012 | Ike | G01R 31/52 324/509 |
| 2012/0212062 A1* | 8/2012 | Yamada | H02J 7/00302 307/80 |
| 2012/0299549 A1* | 11/2012 | Kim | H01M 10/0445 320/128 |
| 2012/0319483 A1* | 12/2012 | Scruggs | H02J 1/10 307/52 |
| 2012/0319653 A1* | 12/2012 | Kumar | H02J 7/0031 320/118 |
| 2013/0099574 A1* | 4/2013 | Bourgeois | H02J 9/062 307/64 |
| 2013/0106178 A1* | 5/2013 | Girard | H01M 10/482 307/9.1 |
| 2013/0169038 A1* | 7/2013 | King | H02J 7/0031 307/66 |
| 2013/0200856 A1* | 8/2013 | Zhang | B60L 3/0046 320/150 |
| 2013/0320927 A1* | 12/2013 | Kumagai | H02J 9/06 320/126 |
| 2014/0009090 A1* | 1/2014 | Ashida | B60L 3/0038 318/139 |
| 2014/0021925 A1* | 1/2014 | Asakura | G01R 31/3648 320/126 |
| 2014/0028245 A1* | 1/2014 | Shim | H02J 7/00036 320/106 |
| 2014/0031979 A1* | 1/2014 | Borinato | H02J 7/0036 901/1 |
| 2014/0077604 A1* | 3/2014 | Shibata | H02S 40/38 307/66 |
| 2014/0145727 A1* | 5/2014 | Ike | G01R 31/52 324/509 |
| 2014/0152100 A1* | 6/2014 | Lim | H02J 3/32 307/18 |
| 2014/0191720 A1* | 7/2014 | Sugiyama | B60L 7/14 320/109 |
| 2014/0306662 A1* | 10/2014 | Kim | H02J 7/0016 320/118 |
| 2014/0377594 A1* | 12/2014 | Suzuki | H01M 10/482 429/7 |
| 2015/0035496 A1* | 2/2015 | Kikuchi | B60L 50/10 174/68.2 |
| 2015/0069830 A1* | 3/2015 | Huang | H02H 7/18 307/9.1 |
| 2015/0097430 A1* | 4/2015 | Scruggs | H02J 7/34 307/23 |
| 2015/0097435 A1* | 4/2015 | Scruggs | H02J 7/34 307/52 |
| 2015/0132624 A1* | 5/2015 | Nagato | G01R 31/389 429/91 |
| 2015/0137603 A1* | 5/2015 | Scruggs | H02J 9/06 307/52 |
| 2015/0200559 A1* | 7/2015 | Im | H02J 7/0022 307/18 |
| 2015/0295420 A1* | 10/2015 | Cheng | H02J 7/00047 320/128 |
| 2016/0043447 A1* | 2/2016 | Peh | H02J 7/0013 320/112 |
| 2016/0049813 A1* | 2/2016 | Takizawa | H01M 10/482 320/112 |
| 2016/0094065 A1* | 3/2016 | Motoichi | H02J 7/0049 320/126 |
| 2016/0185230 A1* | 6/2016 | Reichow | B60L 50/10 307/10.1 |
| 2016/0200214 A1* | 7/2016 | Ishibashi | B60L 58/12 180/65.1 |
| 2016/0294214 A1* | 10/2016 | Mosman | H02J 9/061 |
| 2016/0372801 A1* | 12/2016 | Clemente | H01M 10/4207 |
| 2016/0375774 A1* | 12/2016 | Lauter | B60L 3/04 318/400.22 |
| 2017/0054134 A1* | 2/2017 | Choi | G01R 31/3648 |
| 2017/0080883 A1* | 3/2017 | Yasunori | B60R 16/033 |
| 2017/0108237 A1* | 4/2017 | Cubizolles | F04D 29/705 |
| 2017/0125866 A1* | 5/2017 | Zhou | H01M 10/60 |
| 2017/0131345 A1* | 5/2017 | Koellner | H05B 45/395 |
| 2017/0141439 A1* | 5/2017 | Hansen | H01M 10/482 |
| 2017/0141589 A1* | 5/2017 | Inoue | H02J 7/34 |
| 2017/0163083 A1* | 6/2017 | Moore | H02J 9/00 |
| 2017/0201103 A1* | 7/2017 | Jeon | H02J 7/0029 |
| 2017/0358936 A1* | 12/2017 | Kang | H01M 50/572 |
| 2018/0019609 A1* | 1/2018 | Kammerlander | H02J 7/00712 |
| 2018/0042097 A1* | 2/2018 | Kim | A61B 6/4405 |
| 2018/0102641 A1* | 4/2018 | Tung | H02J 7/0016 |
| 2018/0123334 A1* | 5/2018 | She | H05K 7/02 |
| 2018/0203054 A1* | 7/2018 | Romero | G01R 31/007 |
| 2018/0208066 A1* | 7/2018 | Rao | B60L 53/14 |
| 2018/0287398 A1* | 10/2018 | Melack | H02J 7/0013 |
| 2019/0006831 A1* | 1/2019 | She | H01G 9/26 |
| 2019/0020074 A1* | 1/2019 | Motoichi | H02J 7/00714 |
| 2019/0036177 A1* | 1/2019 | Nagato | G01R 31/389 |
| 2019/0103592 A1* | 4/2019 | Tsai | H05B 45/00 |
| 2019/0104578 A1* | 4/2019 | Tsai | B23K 26/382 |
| 2019/0152333 A1* | 5/2019 | Huynh | H01M 10/482 |
| 2019/0288528 A1* | 9/2019 | Greetham | H02J 7/0024 |
| 2019/0348721 A1* | 11/2019 | Unno | H01M 10/052 |
| 2019/0350104 A1* | 11/2019 | Belady | G06F 1/26 |
| 2019/0350105 A1* | 11/2019 | Belady | G06F 1/30 |
| 2019/0372297 A1* | 12/2019 | Jakubowicz | H01S 5/0282 |
| 2020/0006961 A1* | 1/2020 | Zhou | H02J 7/005 |
| 2020/0235557 A1* | 7/2020 | She | H02G 5/007 |
| 2020/0274368 A1* | 8/2020 | Crouse, Jr. | H02J 7/00309 |
| 2020/0277080 A1* | 9/2020 | Wiegman | B64F 5/60 |
| 2020/0307390 A1* | 10/2020 | Clark | B64D 31/00 |
| 2021/0009005 A1* | 1/2021 | Sugimura | H02J 7/0024 |
| 2021/0036698 A1* | 2/2021 | Nakano | H02J 9/062 |
| 2021/0070179 A1* | 3/2021 | Wiegman | B60L 3/0046 |
| 2021/0070457 A1* | 3/2021 | Wiegman | B64D 27/24 |
| 2021/0083488 A1* | 3/2021 | Hirose | H02J 7/36 |
| 2021/0111568 A1* | 4/2021 | Cho | H02J 7/0031 |
| 2021/0143650 A1* | 5/2021 | Wang | A01D 34/64 |
| 2021/0159715 A1* | 5/2021 | Agamy | H02J 7/35 |
| 2021/0170891 A1* | 6/2021 | Lee | H02J 7/007182 |
| 2021/0206276 A1* | 7/2021 | Wiegman | B64C 29/0008 |
| 2021/0309110 A1* | 10/2021 | Wiegman | B64C 29/0025 |
| 2021/0309383 A1* | 10/2021 | Clark | B64D 31/12 |
| 2021/0309392 A1* | 10/2021 | Wiegman | B64F 5/60 |
| 2021/0313804 A1* | 10/2021 | Wiegman | B64D 35/02 |
| 2022/0026493 A1* | 1/2022 | Klee | G01R 31/3648 |
| 2022/0311081 A1* | 9/2022 | Niedzwiecki | H01M 50/233 |

OTHER PUBLICATIONS

"What are the advantages of transistor switching circuits," Bob, Yahoo Answers, Published online Sep. 5, 2010, Accessed Online Aug. 27, 2015, https://answers.yahoo.com/question/index?qid=20100905005653AAkzUhG (Year: 2010).*

* cited by examiner

SYSTEM FOR CHARGING MULTIPLE POWER SOURCES AND MONITORING DIODE CURRENTS FOR FAULTS

FIELD OF THE INVENTION

The present invention generally relates to the field of power source structures. In particular, the present invention is directed to a system for charging multiple power sources.

BACKGROUND

Electric aircraft often rely on batteries in order to power the aircraft. If an electric aircraft experiences a failure in its power source system, the results can be catastrophic. Existing solutions do not provide an adequate way of eliminating points of failure in the power source system in order to preserve the safety of the aircraft.

SUMMARY OF THE DISCLOSURE

In an aspect, A system for charging multiple power sources, including a plurality of batteries; a plurality of diodes, each diode of the plurality of diodes electrically connected in series with at least a battery of the plurality of batteries, wherein each diode of the plurality of diodes restricts current flow into the plurality of batteries and the plurality of diodes permits current flow from the plurality of batteries. The system for charging multiple power sources further including a bus element, wherein the bus element electrically connects to the diodes in parallel; the bus element includes a cross tie element having an engaged state and disengaged state; and the bus element disconnects a first battery of the plurality of batteries from a second battery of the plurality of when the cross tie element is in the disengaged state, and connects the first battery to the second battery when the cross tie element is in the engaged state. Power source structure also includes a load electrically connected to the plurality of diodes.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a power source structure incorporating diodes for use in an electric aircraft. In an embodiment, each battery or power source in the power source structure can be connected to two sets of a diode and a current sensor, the sets wired to the battery in parallel. In another embodiment, the batteries may be connected to a bus element.

Aspects of the current disclosure help improve the redundancy of the power systems of an electric aircraft. This is particularly important because if the power systems of an electric aircraft fail, those on board, as well as those on the ground may be placed in grave danger. Arranging batteries in parallel helps to provide needed redundancy if a battery were to fail and diodes can be used in order to prevent electricity from flowing from one battery in parallel to another of the batteries in parallel.

Figure 1:
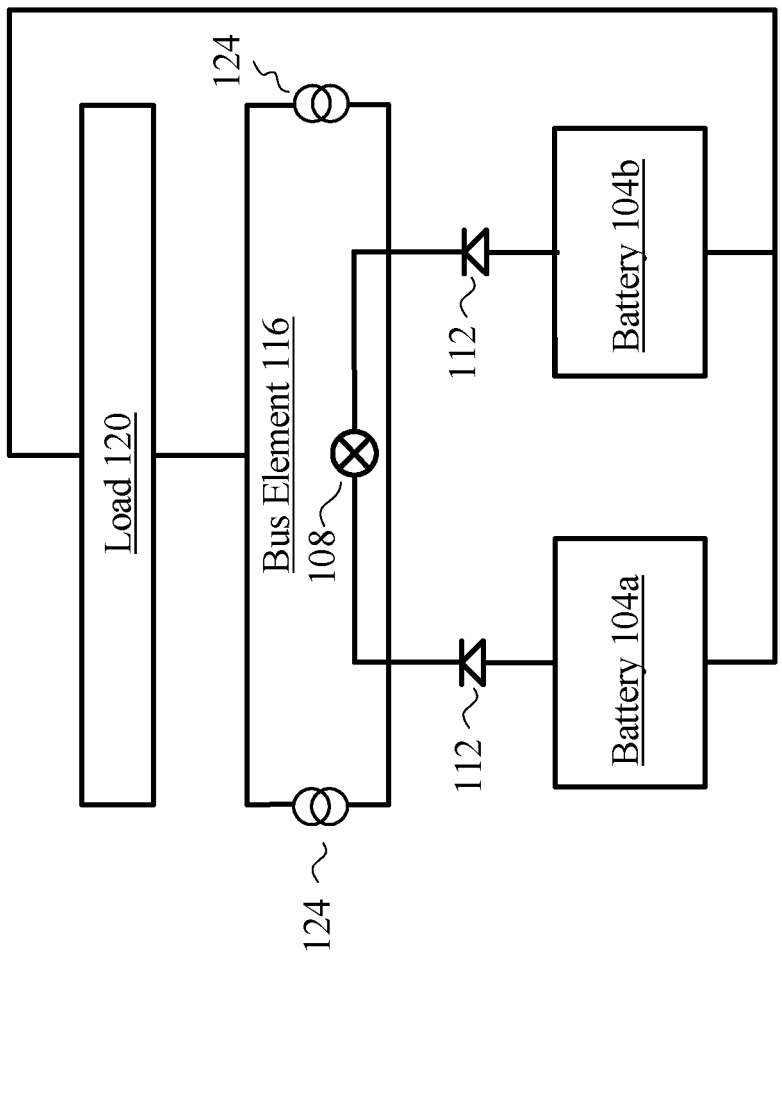
FIG. 1 is a diagram of a system for charging multiple power sources.

FIG. 1 is a diagram of system for charging multiple power sources 100 including a plurality of batteries 104a-b, cross tie element 108, diode 112, bus element 116, and load 120. Each battery of plurality of batteries 104a-b is an energy storage device for the purposes of this disclosure. Battery 104 may include an electrochemical cell configured to store potential electrical energy in the form of a chemical reaction. Battery 104 can be any energy storage element such as such as pouch cells, cylindrical cells, or electrochemical cells, for example. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, battery 104 need not be made up of only a single electrochemical cell, it can consist of several electrochemical cells wired in series or in parallel. FIG. 1 depicts an embodiment of this disclosure where there are two batteries 104 wired in parallel. However, in other embodiments, there may be more than two batteries 104 wired in parallel. For instance, in some embodiments, there may be four batteries 104 wired in parallel. In other embodiments, there may be more than four batteries 104 wired in parallel. One of ordinary skill in the art, upon reviewing the entirety of this disclosure, would appreciate that any number of batteries 104 may be wired in parallel according to the energy needs of the particular application. Additionally, in a non-limiting embodiment, two or more batteries 104 may be wired in series, while wired in parallel to one or more other batteries 104. One of ordinary skill in the art, upon reviewing the entirety of this disclosure, would realize that any number of wiring configurations for any number of batteries 104 would be suitable for this application.

With continued reference to FIG. 1, a plurality of batteries 104 may, in some embodiments, include a battery management component. The battery management component may check the voltage, charge state, capacity, health, temperature or any other battery measurement. In some embodiments, where the battery management component detects that one of the previously listed battery measurements indicates a fault, then battery management component may send an alert to the user, or may deactivate the battery for which a fault was detected. The battery management component may be implemented as disclosed in U.S. application Ser. No. 17/111,002, filed on Dec. 3, 2020, entitled "Systems and Methods for a Battery Management System Integrated in a Battery Pack Configured for Use in Electric Aircraft," the entirety of which is incorporated herein by reference.

With continued reference to FIG. 1, a diode 112 is joined in series with each battery 104. For the purposes of this disclosure, diode 112 can be any electronic component that provides low resistance to electronic current flowing on one direction and high resistance to electronic current flowing in the other direction. The low resistance is ideally very close to zero. The high resistance is ideally very high. As a non-limiting example, the high resistance may be in the range of 1000 ohms to 10 megaohms. In some embodiments, the high resistance may be higher than the previously listed range. Each diode 112 is configured such that it allows current to flow in the direction from battery 104 to bus element 116 but, conversely, restricts current flow from bus element 116 to the battery 104. Diode 112 may be any type of diode.

With continued reference to FIG. 1, a bus element 116 is connected to each diode 112 in the plurality of diodes 112. For the purposes of this disclosure, a "bus element" is an electrically conductive pathway connecting at least a component in a system configured to convey electrical energy between components. Bus element 116 may include one or more electrically conductive pathways configured to transfer electrical energy across the pathways to convey electrical energy from one component to one or more other components. Bus element 116 may include, without limitation, one or more metallic strips and/or bars. Bus element 116 may include a ring bus. Bus element 116 may be implemented as disclosed in U.S. application Ser. No. 17/348,240, filed on Jun. 15, 2021, titled "System and Method for Dynamic Excitation of an Energy Storage Element Configured for Use in an Electric Aircraft," the entirety of which is hereby incorporated by reference. For the purpose of this disclosure, a "ring bus" is a bus element wherein circuit breakers are connected to form a ring with isolators on both sides of each circuit breaker. Ring bus 116 may include a component configured to isolate a fault by tripping two circuit breakers while all other circuits remain in service; such a component may include a cross tie element as described in this disclosure. Bus element 116 may be disposed in or on a switchgear, panel board, busway enclosure, plurality of batteries 104, any portion of electric aircraft, plurality of propulsors, or a combination thereof. Bus element 116 may also be used to connect high voltage equipment at electrical switchyards, and low voltage equipment in plurality of batteries 104. Bus element 116 may be uninsulated; Bus element 116 may have sufficient stiffness to be supported in air by insulated pillars. These features allow sufficient cooling of the conductors, and the ability to tap in at various points without creating a new joint. Bus element 116 may include material composition and cross-sectional size configured to conduct electricity where the size and material determine the maximum amount of current that can be safely carried. Bus element 116 may be produced in a plurality of shapes including flat strips, solid bars, rods, or a combination thereof. Bus element 116 may be composed of copper, brass, aluminum as solid or hollow tubes, in embodiments. Bus element 116 may include flexible buses wherein thin conductive layers are sandwiched together; such an arrangement may include a structural frame and/or cabinet configured to provide rigidity to Bus element 116. Bus element 116 may include distribution boards configured to split the electrical supply into separate circuits at one location. Busways, or bus ducts, are long busbars with a protective cover. Rather than branching from the main supply at one location, they allow new circuits to branch off anywhere along the route of the busway. Bus element 116 may either be supported on insulators, or else insulation may completely surround it. Busbars are protected from accidental contact either by an enclosure or by design configured to remove it from reach. Bus element 116 may be connected to each other and to electrical apparatus by bolted, clamped, or welded connections.

With continued reference to FIG. 1, bus element 116 is connected to a load 120. Load 120 may, as a non-limiting example include any component of an electric aircraft that is powered by batteries. As a non-limiting example, load 120 may include a motor, a fan, a processor, a flight controller, avionics, actuators, a computer, lights, climate control, or any other appropriate load. As another non-limiting example, load 120 may include a flight component. Flight component may include power sources, control links to one or more elements, fuses, and/or mechanical couplings used to drive and/or control any other flight component. Flight component may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers (not shown) or other components for regulating motor speed, rotation direction, and/or dynamic braking. While FIG. 1 only depicts one load 120, there may be any number of loads 120. For instance, in one embodiment, there may be four different loads 120. These loads 120 may be each wired to bus element 116. One of ordinary skill in the art, upon reviewing the entirety of this disclosure, would recognize that any number of loads 120 or configurations of loads 120 are possible.

Further referring to FIG. 1, cross tie element 108 is an element of bus element 116. As a non-limiting example, disconnection of a cross tie element 108 may isolate a single energy storage element of plurality of batteries 104 from all other batteries 104 electrically connected to bus element 116 and/or may isolate a first plurality of batteries 104 from a second plurality of batteries 104. More generally, any number of cross tie elements 108 may operate to divide plurality of batteries 104 into various different groups and/or isolate any single battery 104 one by one or two or more at a time. Where cross tie element 108 separates a first battery 104 from a second battery 104, either of first or second battery 104 may be part of a plurality of batteries 104 that remain interconnected and/or may be isolated from all other batteries 104. Cross tie element 108 may be implemented, without limitation, as any switch, relay, or other circuit element capable of acting to open or close a circuit, such as without limitation electrically actuated switches, semiconductor circuit elements such as transistors, which may include field-effect transistors (FETs), metal oxide FETs (MOSFETs), bipolar junction transistors, or the like.

Figure 2:
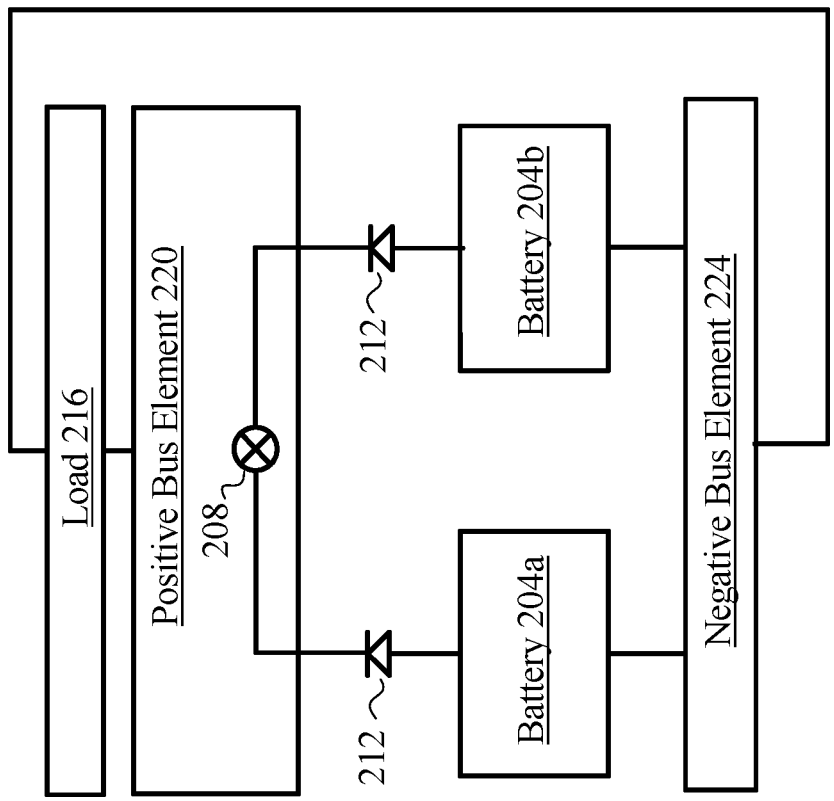
FIG. 2 is a diagram of a system for charging multiple power sources having a positive bus element and a negative bus element.

Referring now to FIG. 2, an exemplary embodiment of a system for charging multiple power sources 200 is depicted. System for charging multiple power sources 200 contains many of the same elements as system for charging multiple power sources 100. Particularly, batteries 204*a-b*, cross tie element 208, diode 212, and load 216, may be consistent with any of the respective elements consistent with this disclosure with reference to FIG. 1.

With continued reference to FIG. 2, system for charging multiple power sources 200 also may contain positive bus element 220. Positive bus element may be consistent with bus element 116 in FIG. 1. Load 216 may be wired to positive bus element 220. Alternatively, in another non-limiting embodiment, positive bus element 220 may be separately wired to each load 216 of which there may be a plurality. Positive bus element 220 may be wired to each of diodes 212.

With continued reference to FIG. 2, system for charging multiple power sources 200 also may contain a negative bus element 224. Negative bus element 224 may be consistent with the technical disclosure for bus element 116 in FIG. 1. Load 216 may be wired to negative bus element 224. Alternatively, in another non-limiting embodiment, negative bus element 224 may be separately wired to each load 216 of which there may be a plurality. Negative bus element 224 may be wired to each of the batteries 204a-b. In some embodiments, negative bus element 224 may be wired to the negative end of batteries 204a-b. For the purposes of this disclosure, the "negative end" of batteries 204, is the anode end of batteries 204a-b.

Figure 3:
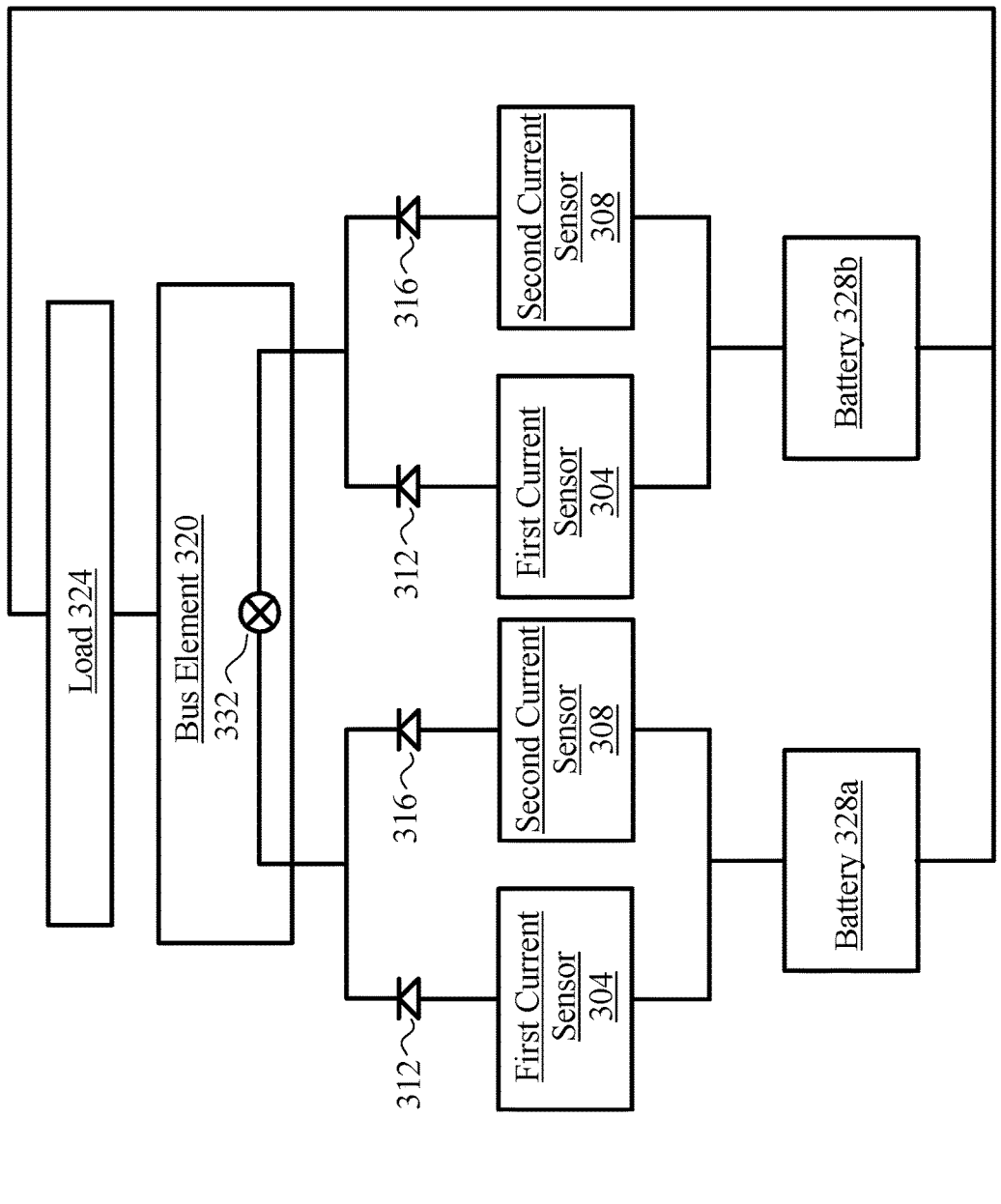
FIG. 3 is a diagram of a system for charging multiple power sources wherein each battery is wired to diodes placed in parallel.

FIG. 3 shows a diagram of an exemplary embodiment of system for charging multiple power sources 300, system for charging multiple power sources 300 containing a first current sensor 304 and a second current sensor 308. First current sensor may be wired in series to a first diode 312. Second current sensor 308 may be wired in series to a second current sensor 308. One end of first current sensor 304 and second current sensor 308 may be wired to battery 328a-b and first diode 312 and second diode 316 may be wired to bus element 320, such that first current sensor 304 and first diode 312 are in parallel with second current sensor 308 and second diode 316. Bus element may be wired to load 324 and load 324 may be also wired to the negative end of battery 328a-b.

With continued reference to FIG. 3, the first current sensor 304 and second current sensor 308 can be any type of device adapted to measure current in an electric circuit, such as an ammeter. Furthermore, first current sensor 304 and second current sensor 308 could be any type of ammeter, such as a moving-coil ammeter, a moving magnet ammeter, an electrodynamic ammeter, a moving-iron ammeter, a hot-wire ammeter, a digital ammeter, or an integrating ammeter. One of ordinary skill in the art, upon reviewing the entirety of this disclosure, would realize that a wide variety of methods for measuring current in an electric circuit would be compatible with this disclosure.

With continued reference to FIG. 3, in the event that the first current sensor 304 detects a measurement of double the expected current and the second current sensor 308 detects a current measurement of zero, a diode failure may be signaled. In a non-limiting example, where first diode 312 and second diode 316 have the same specifications, then the expected current flowing through first current sensor 304 and second current sensor 308 may each be half of the current flowing from battery. However, if one of first diode 312 and second diode 316 has experienced partial diode failure, then the current flowing through the other diode may increase; system 100 may detect increase in current through one diode and decrease in current through another diode to identify partial failure. Thus, if first current sensor 304 detects a current measurement of higher than the expected current and second current sensor 308 detects a current measurement of less than the expected current, then it is likely that there has been a partial diode failure. If one of first diode 312 and second diode 316 has experienced diode failure, then the current flowing through the other diode may double. Thus, if first current sensor 304 detects a current measurement of double the expected current and second current sensor 308 detects a current measurement of zero, then it is likely that there has been a diode failure. Alternatively, in another non-limiting embodiment, diode failure may be signaled when first current sensor 304 and second current sensor 308 detect different current measurements. For the purposes of this disclosure, current measurements are "different" if the difference between the measurements falls outside of a tolerance. As a non-limiting example, the tolerance could be 1% of an expected current, 5% of an expected current, or any other tolerance sufficient to indicate diode failure.

With continued reference to FIG. 3, diode failure may be signaled in a variety of ways. In one non-limiting embodiment, diode failure may be signaled by communicating the diode failure to a user. For the purposes of this disclosure, "user" is anyone operating a system in which the disclosed power source structure is included. As a non-limiting example, where the power source structure, such as system for charging multiple power sources 300, is located in an electric aircraft, a user may be the pilot of that electric aircraft. In one embodiment, signaling a diode failure may include sending an error message. This error message may be communicated to the user in a variety of ways, such as by displaying the error message on a screen, by displaying an alert on a screen, by turning on a warning light, or by way of a warning noise. As a non-limiting example, the error message may include a text message where the text message is displayed on a screen to alert the user. As another non-limiting example, the error message may include an audio message such as an alarm sound, loud beep, or any other noise sufficient to alert the user. These are merely examples; one of ordinary skill in the art, upon reviewing the entirety of this disclosure, would appreciate that there are a wide variety of ways to communicate an error message to a user. In another embodiment, signaling diode failure may include deactivating a battery. For example, is second current sensor 308 were to experience diode failure, then signaling a diode failure may include deactivating battery 328a-b. A variety of devices may be responsible for detecting and/or signaling a diode failure, including a computing device, a flight controller, and/or a battery management system. Additionally, a computing device, flight controller, and/or a battery management system may be implemented to monitor first current sensor 304 and second current sensor 308. One of ordinary skill in the art, upon reviewing the entirety of this disclosure, would appreciate that a wide variety of devices would be suitable for this task.

Returning to FIG. 3, Battery 328a-b may be consistent with any previously described battery in this disclosure. First diode 312 and second diode 316 may be consistent with any previously described diode in this disclosure. Bus element 320 may be consistent with any previously described bus element in this disclosure. Cross tie element 332 may be consistent with any previously described cross tie element in this disclosure.

With continued reference to FIG. 3, bus element 320 may be wired to a load 324. Load 324 may, as a non-limiting example be any component of an electric aircraft that is powered by batteries. As a non-limiting example, load 324 may include a motor, a fan, a processor, a flight controller, avionics, actuators, a computer, lights, climate control, or any other appropriate load. While FIG. 3 only depicts one load 324, there may be any number of loads 324. For instance, in one embodiment, there may be four different loads 324. These loads 324 may be each wired to bus element 320. One of ordinary skill in the art, upon reviewing the entirety of this disclosure, would recognize that any number of loads 324 or configurations of loads 324 are possible.

With continued reference to FIG. 3, load 324 may be wired to battery 328a-b or to each battery 328a-b. While FIG. 3 only depicts a single bus element 320, a non-limiting embodiment may incorporate the negative bus element 224 and positive bus element 220 configuration from FIG. 2. For instance, load 324 may be wired to a negative bus element which is in turn wired to battery 328a-b or each battery 328a-b. Additionally, for example, a positive bus element may take the place of bus element 320 such that first diode 312 and second diode are wired to a positive bus element, and the positive bus element is wired to load 324 or each load 324.

With continued reference to FIG. 3, in some embodiments several batteries 328 may be placed in parallel, each with a set of first current sensor 304, second current sensor 308, first diode 312, and second diode 316. While FIG. 3 only shows two batteries 328a-b, one of ordinary skill in the art, upon reviewing the entirety of this disclosure, would appreciate that any number of batteries 328a-b could be included in system for charging multiple power sources 300.

Figure 4:
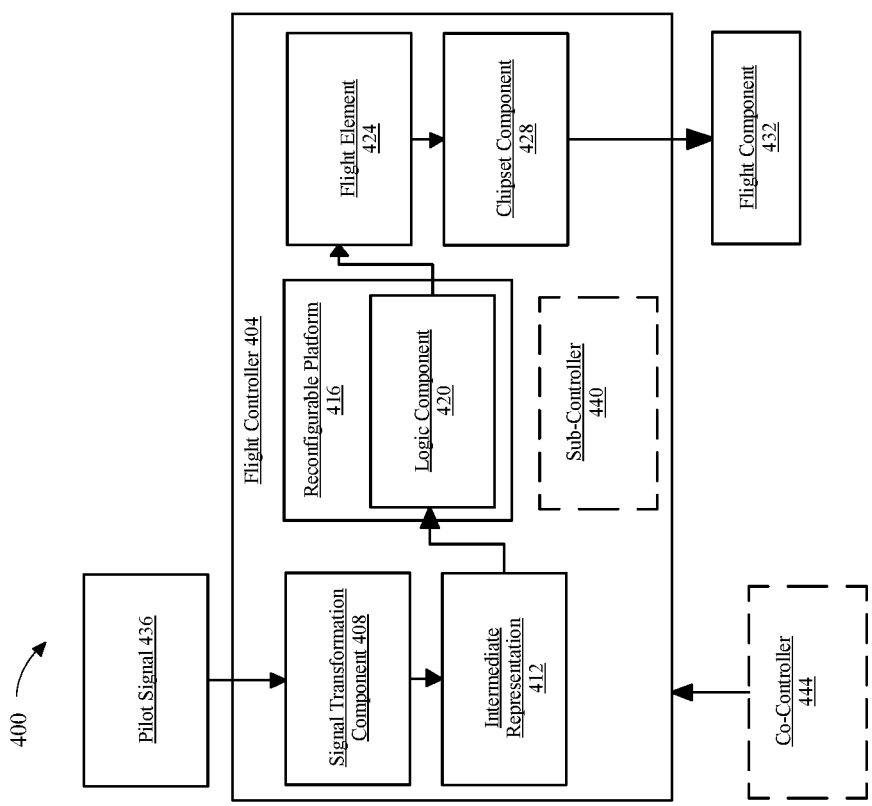
FIG. 4 is a block diagram of an exemplary flight controller.

Moving to FIG. 4, FIG. 4 depicts an exemplary embodiment 400 of a flight controller 404. First current sensor 304 and second current sensor 308 may be in electronic communication, as a non-limiting example, with flight controller 404, or some other computing device. In an embodiment, flight controller 404 may be responsible for monitoring the current measurements of first current sensor 304 and second current sensor 308. In some embodiments, flight controller 404 may also be responsible for signaling a diode failure as covered in this disclosure. In some embodiments, there may be a battery management system in electronic communication with each set of first current sensor 304 and second current sensor 308. In other embodiments, there may be a single battery management system in electronic communication with all of the current sensor in the power source structure. Additionally, in yet other embodiments, a battery management system may also be in electronic communication with battery 328a-b or plurality of batteries 328a-b and may measure cell voltage, battery capacity, or any other appropriate battery measurement. In some embodiments, battery management system may signal diode failure, or, in another embodiment, battery management system may preform the monitoring of first current sensor 304 and second current sensor 308 and the signaling of a diode failure in conjunction with flight controller 404, with which it may be in electronic communication.

With continued reference to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may include one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
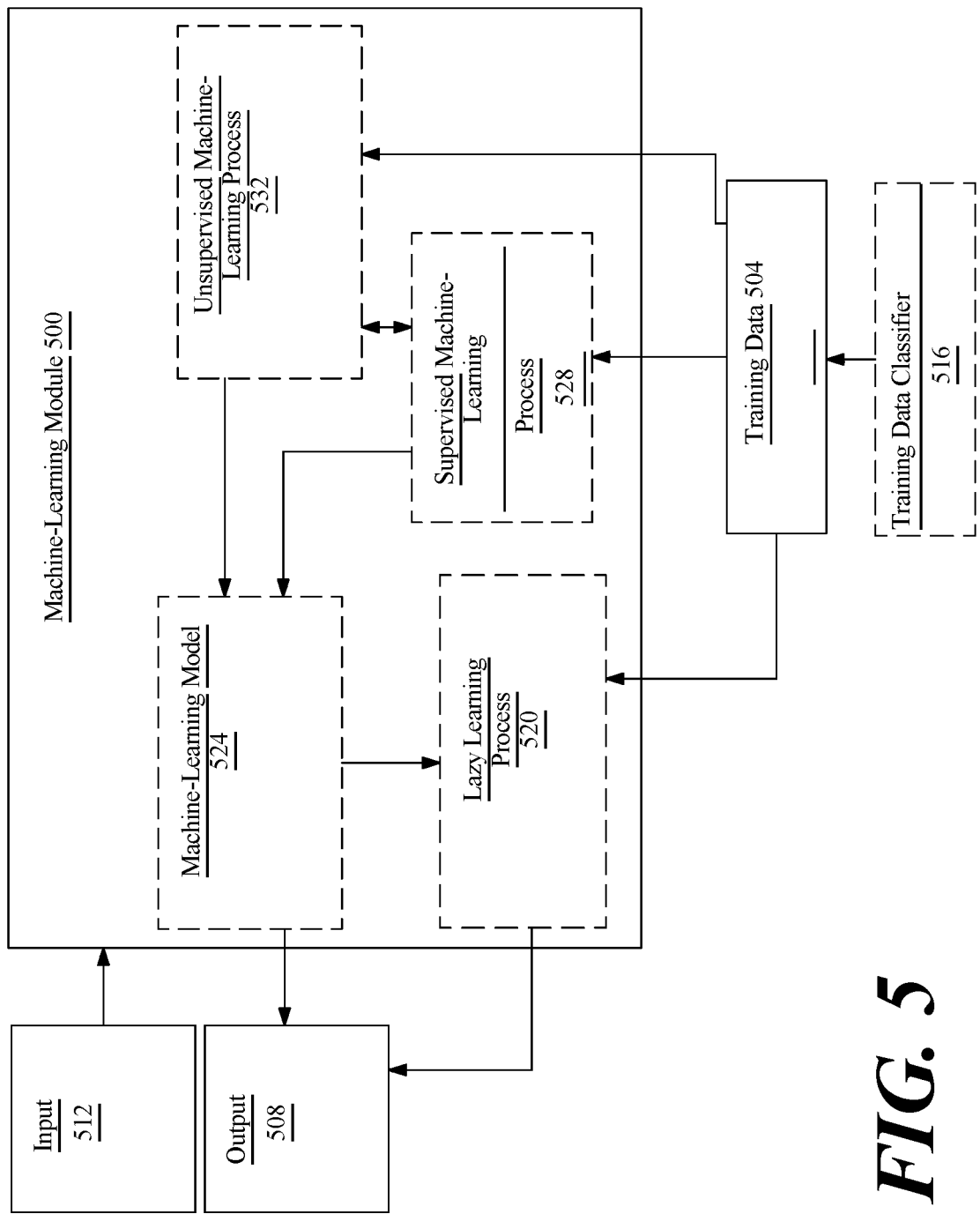
FIG. 5 is a block diagram of an exemplary machine learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples.

Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6B:
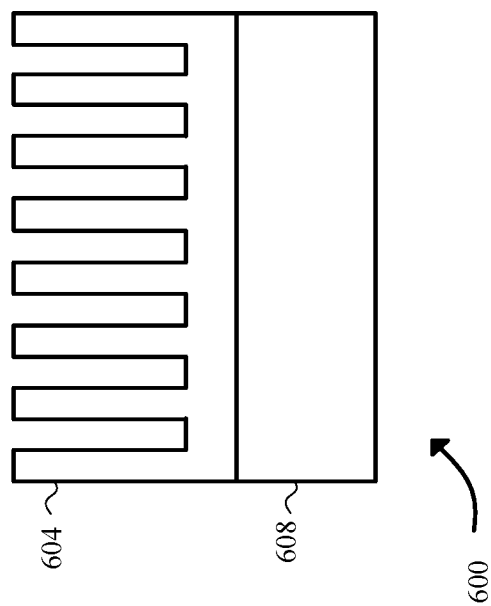
FIG. 6B is a cross-section view of a diode heat sink system.
Figure 6A:
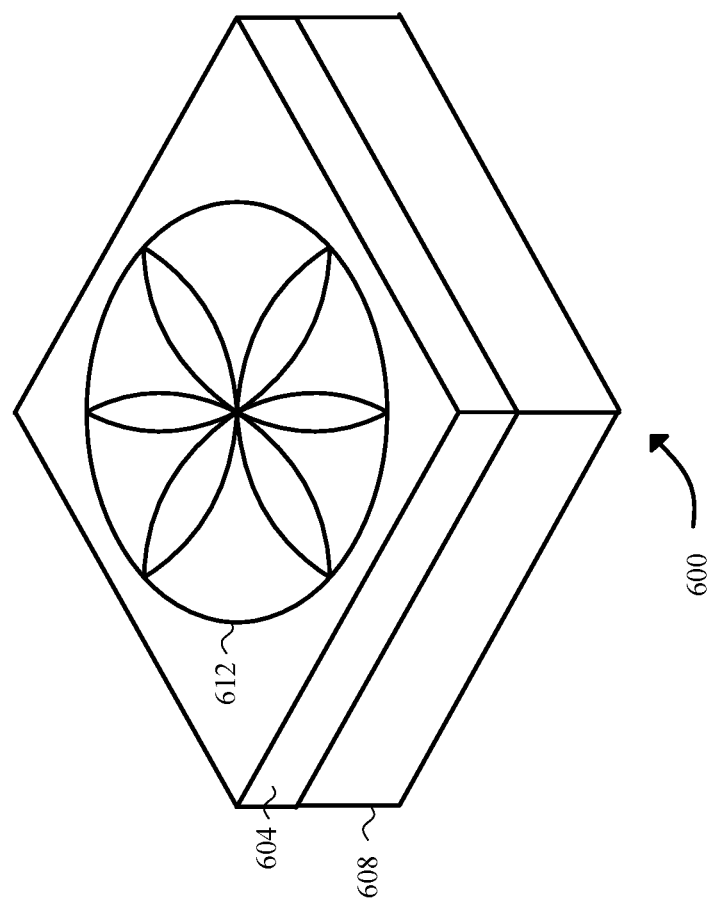
FIG. 6A is an isometric view of a diode heat sink system.

Moving to FIG. 6A, an isometric view of a diode heat sink system 600 is shown. Diode heat sink system 600 includes a heat sink 604 that is mounted on top of diode 608. Heat sink 604 may be made out of a material with a high thermal conductivity value, such as, for example, copper or aluminum. Heat sink 604 helps to dissipate the heat created by diode 608. Heat sink 604 may be any type of heat sink such as a passive heat sink, or an active heat sink. Active heat sinks can encompass heat sinks that utilize forced air or pumped liquid in order to provide enhanced cooling. In a non-limiting embodiment, a fan 612 may be configured to blow air over the heat sink 604 and diode 608. Diode 608 may be consistent with any other diode described as part of this disclosure.

Moving to FIG. 6B, a cross-sectional view of an embodiment of diode heat sink system 600. As with the embodiment in FIG. 6A, heat sink 604 is mounted on top of diode 608. As shown in FIG. 6B, heat sink 604 may include fins in order to increase the heat transfer ability of heat sink 604.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
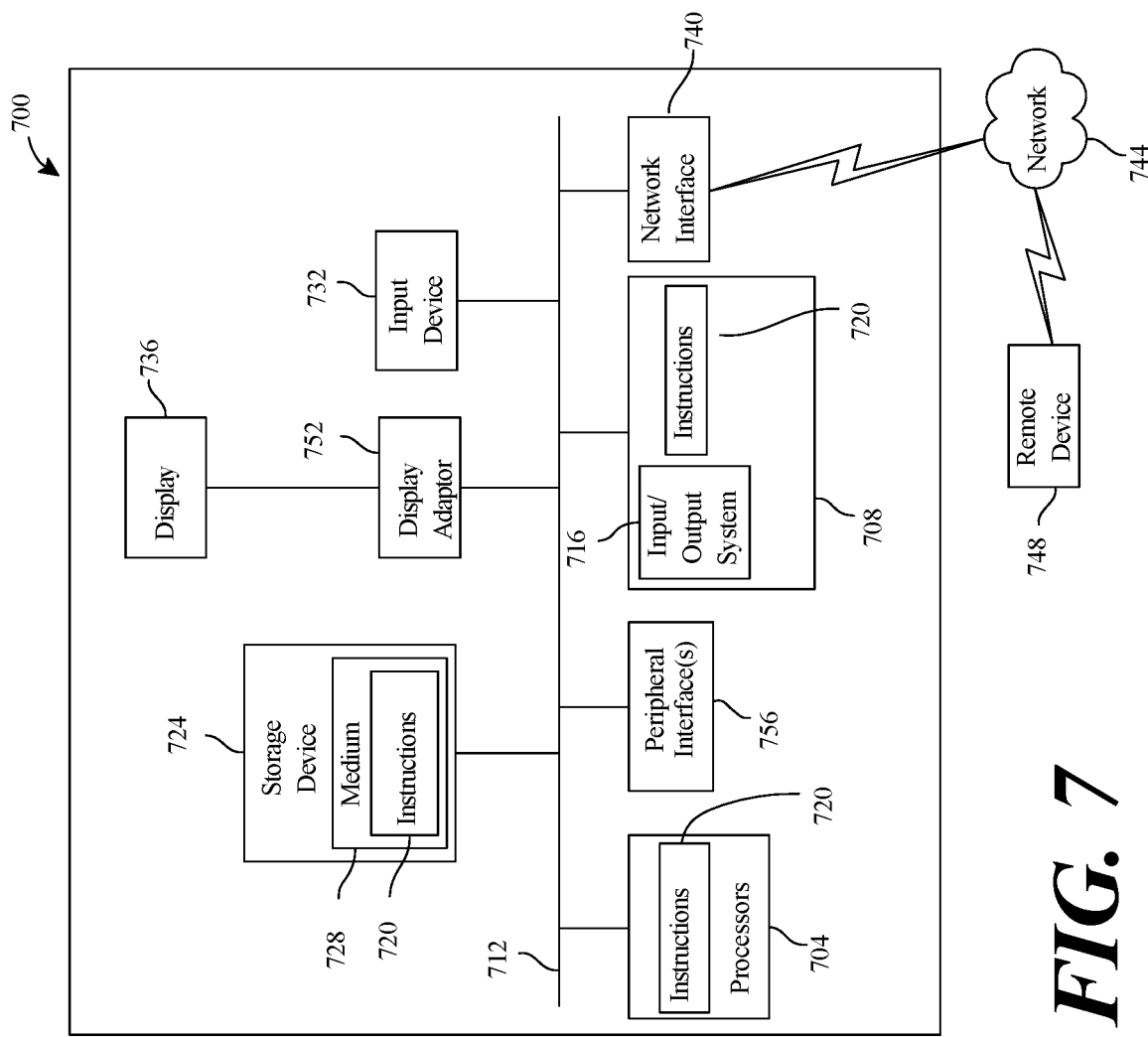
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for charging multiple power sources, the system comprising:
    a plurality of batteries;
    a plurality of diodes, each diode of the plurality of diodes electrically connected in series with at least a battery of the plurality of batteries, wherein each diode of the plurality of diodes restricts current flow into the plurality of batteries and the plurality of diodes permits current flow from the plurality of batteries, wherein each battery is communicatively connected to a first current sensor and a second current sensor, and wherein the first current sensor and the second current sensor are configured to:
        detect, using the first current sensor, a first current measurement;
        detect, using the second current sensor, a second current measurement, wherein the second current measurement is different from the first current measurement amount; and
        determine that a diode failure has occurred where the difference between the first current measurement and the second current measurement exceeds a 5% tolerance sufficient to indicate diode failure and signal the determined diode failure to a user;
    a bus element, wherein the bus element comprises a ring bus, wherein:
        the bus element electrically connects the batteries in parallel;
        the bus element includes a cross tie element having an engaged state and disengaged state, wherein the cross tie element comprises at least a transistor;
        the bus element further comprises flexible buses with conductive layers coupled together which includes a structural frame configured to provide rigidity to the bus element; and
        the bus element is configured to:
            disconnect a first battery of the plurality of batteries from a second battery of the plurality of batteries when the cross tie element is in the disengaged state, wherein the disconnected battery is isolated from the plurality of batteries; and
            connects the first battery to the second battery when the cross tie element is in the engaged state; and
    a load electrically connected to the plurality of diodes.

2. The system for charging multiple power sources of claim 1, wherein a battery of the plurality of batteries is in series with a set of parallel diodes, the set of parallel diodes comprising a first diode of the plurality of diodes and a second diode.

3. The system for charging multiple power sources of claim 1, wherein the first current sensor and the second current sensor are monitored by a flight controller.

4. The system for charging multiple power sources of claim 1, configured to:
    detect, using the first current sensor, a first current measurement of double an expected current;
    detect, using the second current sensor, a second current measurement of zero; and
    determine that a diode failure has occurred.

5. The system for charging multiple power sources of claim 1, further configured to deactivate a battery.

6. The system for charging multiple power sources of claim 1, wherein the plurality of batteries, the plurality of diodes, the bus element, the cross tie element, and the load are incorporated in an electric aircraft.

7. The system for charging multiple power sources of claim 1, wherein the load comprises a flight component.

8. The system for charging multiple power sources of claim 1, wherein the load comprises a plurality of loads.

9. The system for charging multiple power sources of claim 1, wherein the plurality of batteries comprises a battery management component.

10. The system for charging multiple power sources of claim 1, wherein the cross tie element comprises a switch.

11. The system for charging multiple power sources of claim 1, wherein the cross tie element comprises a relay.

12. The system for charging multiple power sources of claim 1, further configured to send an error message.

13. The system for charging multiple power sources of claim 12, wherein the error message is a text message.

14. The system for charging multiple power sources of claim 12, wherein the error message is an audio message.

15. The system for charging multiple power sources of claim 1, wherein a diode of the plurality of diodes includes a heat sink mounted on top of the diode of the plurality of diodes.

16. The system for charging multiple power sources of claim 15, wherein the heat sink comprises cooling fins.

17. The system for charging multiple power sources of claim 15, wherein the heat sink comprises a fan.

* * * * *